(12) United States Patent
Nagoshi et al.

(10) Patent No.: US 12,389,141 B2
(45) Date of Patent: Aug. 12, 2025

(54) OPTICAL COMMUNICATION SYSTEM, CONTROL METHOD AND OPTICAL SUBSCRIBER LINE TERMINAL APPARATUS

(71) Applicant: Nippon Telegraph and Telephone Corporation, Tokyo (JP)

(72) Inventors: Haruka Nagoshi, Musashino (JP); Hiroaki Katsurai, Musashino (JP); Tomoaki Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 170 days.

(21) Appl. No.: 18/037,921

(22) PCT Filed: Nov. 20, 2020

(86) PCT No.: PCT/JP2020/043464
§ 371 (c)(1),
(2) Date: May 19, 2023

(87) PCT Pub. No.: WO2022/107329
PCT Pub. Date: May 27, 2022

(65) Prior Publication Data
US 2024/0007776 A1 Jan. 4, 2024

(51) Int. Cl.
*H04B 10/00* (2013.01)
*H04B 10/079* (2013.01)
(Continued)

(52) U.S. Cl.
CPC ..... *H04Q 11/0067* (2013.01); *H04B 10/0793* (2013.01); *H04B 10/07955* (2013.01); *H04Q 2011/0083* (2013.01)

(58) Field of Classification Search
CPC ....... H04Q 11/0067; H04Q 2011/0083; H04Q 2011/0079; H04Q 11/04; H04B 10/0793;
(Continued)

(56) References Cited

U.S. PATENT DOCUMENTS

2012/0177361 A1* 7/2012 Hirano ................ H04B 10/272 398/1
2014/0079396 A1* 3/2014 Hirano ................ H04B 10/272 398/67

FOREIGN PATENT DOCUMENTS

JP 2012175333 A * 9/2012
TW 201220733 A * 5/2012 ............. H04B 10/27

OTHER PUBLICATIONS

Standards Development Board of the IEEE Communications Society, "IEEE Standard for Service Interoperability in Ethernet Passive Optical Networks (Siepon)," IEEE Std 1904.1-2013, Jun. 14, 2013, 16 pages.

* cited by examiner

*Primary Examiner* — Daniel G Dobson
(74) *Attorney, Agent, or Firm* — Fish & Richardson P.C.

(57) ABSTRACT

An aspect of the present invention is an optical communication system in which an optical line terminal and an optical network unit are connected by an optical communication line, in which when receiving a first activation signal from the optical line terminal in a sleep state, the optical network unit executes activation processing for transition from the sleep state to an activation state and notifies the optical line terminal of an activation time that is a time required for executing the activation processing, and the optical line terminal transmits the activation signal at a time of transmission of second and subsequent activation signals, and then the optical line terminal starts data transmission to the optical line terminal after elapse of the activation time a notification of which has been given from the optical network unit.

6 Claims, 14 Drawing Sheets

(51) Int. Cl.
*H04Q 11/00* (2006.01)
*H04J 14/00* (2006.01)

(58) Field of Classification Search
CPC ............ H04B 10/07955; H04B 10/808; H04B 10/272; H04L 12/44; H04J 14/08
USPC .......................................................... 398/38
See application file for complete search history.

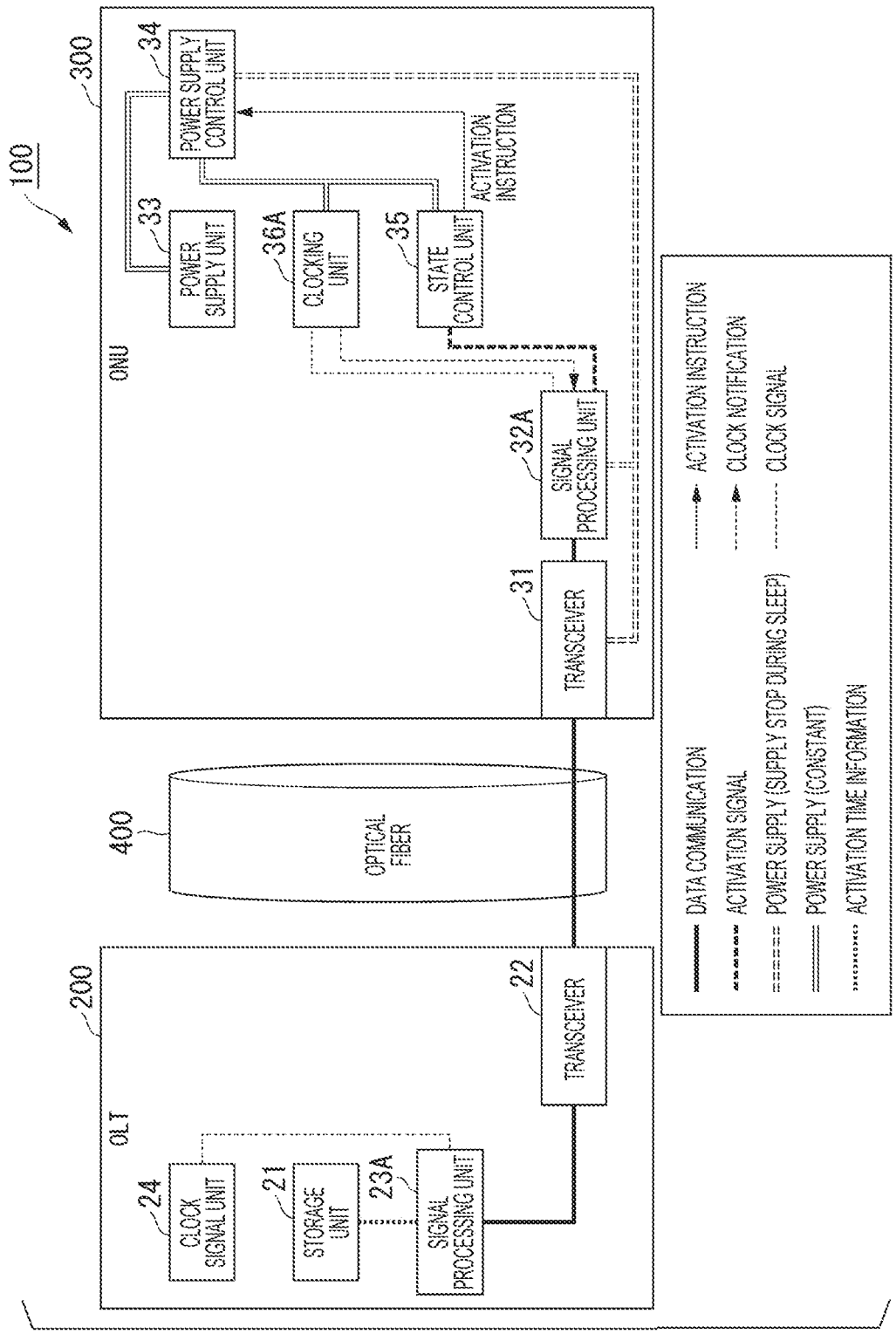

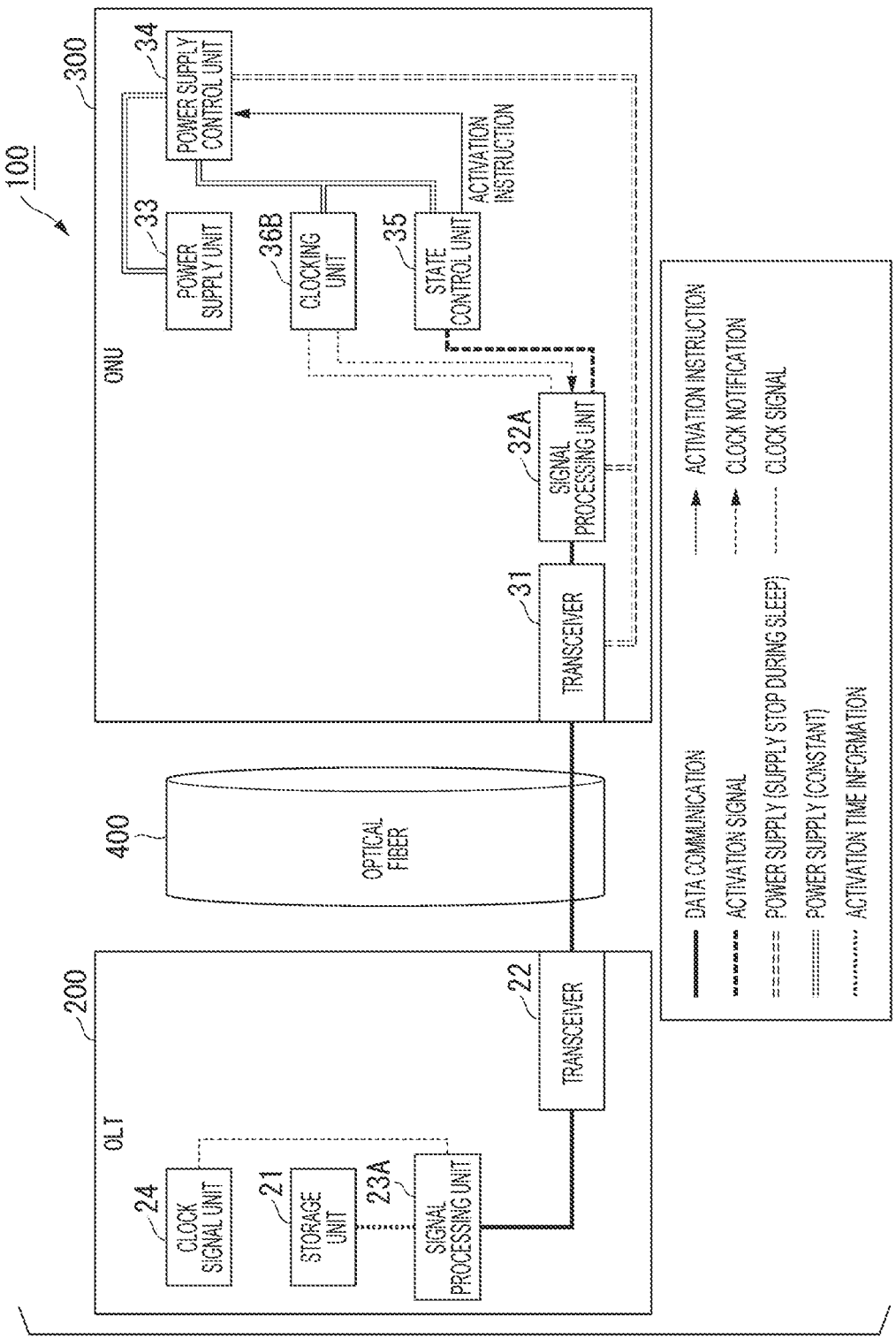

OPTICAL COMMUNICATION SYSTEM, CONTROL METHOD AND OPTICAL SUBSCRIBER LINE TERMINAL APPARATUS

CROSS-REFERENCE TO RELATED APPLICATIONS

This application is a National Stage application under 35 U.S.C. § 371 of International Application No. PCT/JP2020/043464, having an International Filing Date of Nov. 20, 2020, the disclosure of which is considered part of the disclosure of this application, and is incorporated by reference in its entirety into this application.

TECHNICAL FIELD

The present invention relates to a technology of an optical communication system.

BACKGROUND ART

There is an optical communication system in which an optical line terminal (OLT) and an optical network unit (ONU) are connected by an optical communication line (see, for example, Non Patent Literature 1).

FIG. 13 is a diagram illustrating an outline of a configuration of an optical communication system 900 of a conventional configuration. The optical communication system 900 includes an OLT 910, an ONU 920, and an optical fiber 930. The OLT 910 includes a transceiver 911 that inputs and outputs an optical signal, and a signal processing unit 912 that processes the transmitted and received optical signal. The ONU 920 includes a transceiver 921 that inputs and outputs an optical signal, a signal processing unit 922 that processes the transmitted and received optical signal, and a power supply unit 923. The transceiver 911 of the OLT 910 and the transceiver 921 of the ONU 920 are connected by the optical fiber 930. The signal processing unit 912 of the OLT 910 and the signal processing unit 922 of the ONU 920 transmit and receive data via the optical fiber 930.

In such an optical communication system 900, the OLT 910 activates the ONU 920 by transmitting an activation signal for notifying the ONU 920 in a sleep state of an activation instruction. For example, in the example of FIG. 13, the signal processing unit 912 of the OLT 910 transmits the activation signal to the ONU 920 in the sleep state by data communication. In the ONU 920 in the sleep state, power supply by the power supply unit 923 is stopped. Next, the signal processing unit 922 of the ONU 920 receives the activation signal transmitted from the OLT 910. In response to the reception of the activation signal, the signal processing unit 922 generates an activation signal for instructing the power supply unit 923 to return from the sleep state, and outputs the activation signal to the power supply unit 923. The power supply unit 923 starts the stopped power supply in response to the input of the activation signal. Thus, the ONU 920 transitions from the sleep state to the activation state. When the transition to the activation state is completed, the ONU 920 notifies the ONU 910 that the activation has been completed. Upon receiving this notification, the OLT 910 transmits data to the ONU 920.

CITATION LIST

Non Patent Literature

Non Patent Literature 1: IEEE Std. 1904.1-2013 "Standard for Service Interoperability in Ethernet Passive Optical Networks (SIEPON)", "10.5.3.3.5 Active mode resync wake-up mechanism", 2013.

SUMMARY OF INVENTION

Technical Problem

However, when the ONU in the sleep state is activated by transmitting an activation signal from the OLT to the ONU, the ONU needs to wait for a time required to notify the OLT of the activation completion of the own device until the OLT starts data transmission after the activation of the own device is completed. Therefore, wasteful power consumption occurs in the ONU for the waiting time. In order to suppress the occurrence of such wasteful power consumption, it is necessary to shorten a waiting time until the ONU performs data transmission after activation.

In view of the above circumstances, an object of the present invention is to provide a technology capable of reducing power consumption of an optical network unit in an optical communication system in which an optical line terminal and the optical network unit are connected by an optical communication line.

Solution to Problem

An aspect of the present invention is an optical communication system in which an optical line terminal and an optical network unit are connected by an optical communication line, in which when receiving a first activation signal from the optical line terminal in a sleep state, the optical network unit executes activation processing for transition from the sleep state to an activation state and notifies the optical line terminal of an activation time that is a time required for executing the activation processing, and the optical line terminal transmits the activation signal at a time of transmission of second and subsequent activation signals, and then the optical line terminal starts data transmission to the optical line terminal after elapse of the activation time a notification of which has been given from the optical network unit.

An aspect of the present invention is a control method for an optical communication system in which an optical line terminal and an optical network unit are connected by an optical communication line, the method including: when receiving a first activation signal from the optical line terminal in a sleep state, executing, by the optical network unit, activation processing for transition from the sleep state to an activation state; notifying, by the optical network unit, the optical line terminal of an activation time that is a time required for executing the activation processing, and transmitting, by the optical line terminal, the activation signal at a time of transmission of second and subsequent activation signals, and then starting data transmission to the optical line terminal after elapse of the activation time a notification of which has been given from the optical network unit.

An aspect of the present invention is the subscriber line terminal device in an optical communication system in which an optical line terminal and an optical network unit are connected by an optical communication line, in which when receiving a first activation signal from the optical line terminal in a sleep state, the optical network unit executes activation processing for transition from the sleep state to an activation state and notifies the optical line terminal of an activation time that is a time required for executing the activation processing.

Advantageous Effects of Invention

According to the present invention, it is possible to reduce power consumption of an optical network unit (ONU) in an optical communication system in which an optical line terminal (OLT) and the ONU are connected by an optical communication line.

BRIEF DESCRIPTION OF DRAWINGS

FIG. 5 is a diagram illustrating a first configuration example of the optical communication system of the present embodiment.

FIG. 6 is a diagram illustrating a second configuration example of the optical communication system of the present embodiment.

DESCRIPTION OF EMBODIMENTS

An embodiment of the present invention will be described in detail with reference to the drawings.

Figure 1:
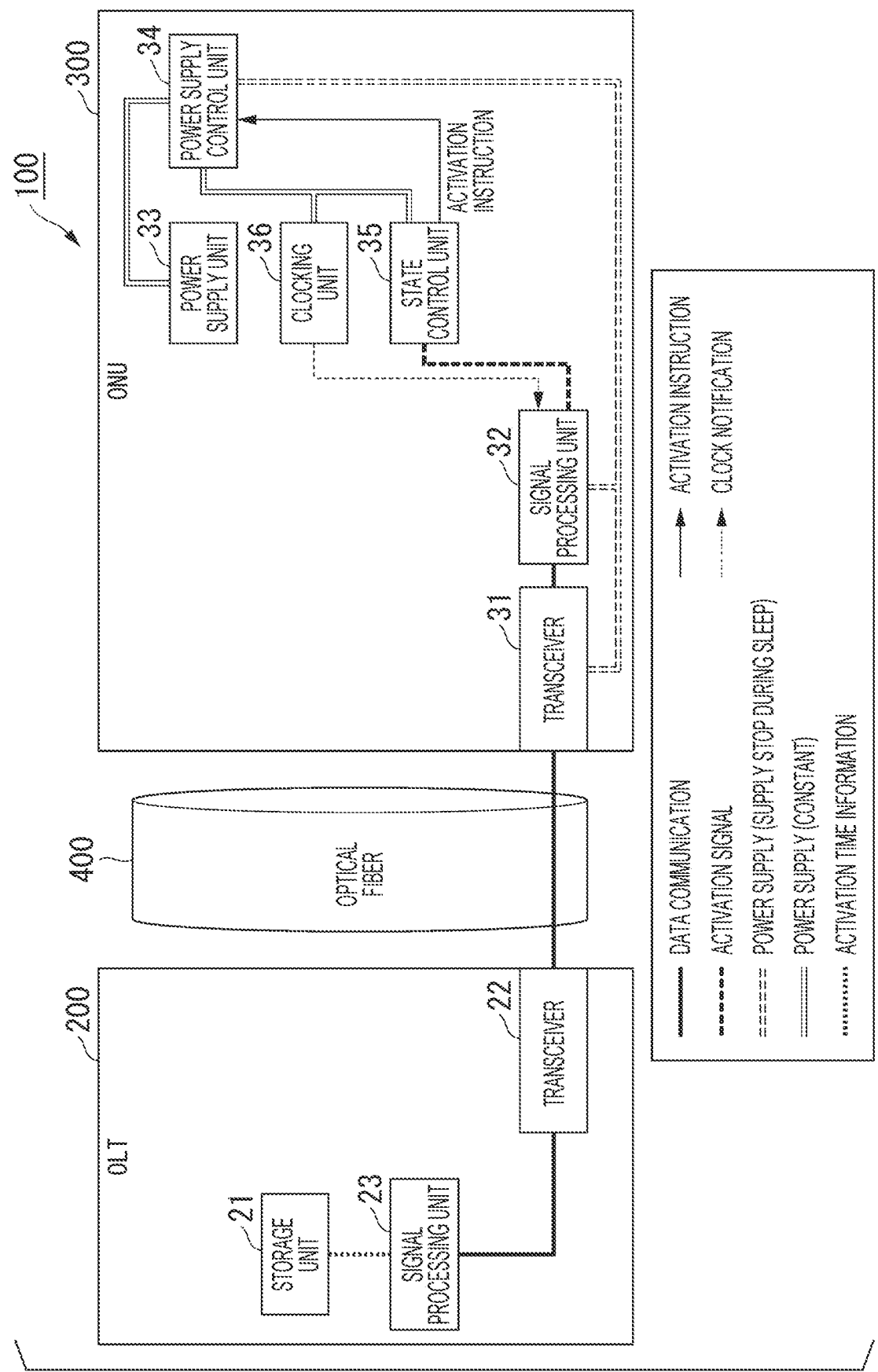
FIG. 1 is a diagram illustrating a system configuration example of an optical communication system of an embodiment.

FIG. 1 is a diagram illustrating a system configuration example of an optical communication system 100 of an embodiment. The optical communication system 100 includes an optical line terminal (OLT) 200, an optical network unit (ONU) 300, and an optical fiber 400 that connects the OLT 200 and the ONU 300. The OLT 200 transmits a signal for controlling the operation state of the ONU 300 to the ONU 300. Specifically, the OLT 200 transmits a sleep signal instructing transition from the activation state to the sleep state and an activation signal instructing transition from the sleep state to the activation state. The ONU 300 transitions from the sleep state to the activation state in response to the reception of the activation signal from the OLT 200, and transitions from the activation state to the sleep state in response to the reception of the sleep signal from the OLT 200. Note that although one ONU 300 is illustrated in FIG. 1 for the sake of simplicity, a plurality of ONUs 300 may be connected to one OLT 200. Hereinafter, configurations of the OLT 200 and the ONU 300 will be described in detail.

The OLT 200 includes a processor such as a central processing unit (CPU) and memory. The OLT 200 functions as a device including a storage unit 21, a transceiver 22, and a signal processing unit 23 when the processor executes a program. Note that all or some of the functions of the OLT 200 may be implemented using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, ROM, a CD-ROM, or a semiconductor storage device (for example, a solid state drive (SSD)), or a storage device such as a hard disk or a semiconductor storage device built in a computer system. The program may be transmitted via an electric communication line.

The storage unit 21 is configured using a magnetic storage device such as a hard disk drive (HDD) or a semiconductor storage device such as a solid state drive (SSD) or flash memory. The storage unit 21 holds various types of information necessary for the operation of the OLT 200. For example, the storage unit 21 stores activation time information received from the ONU 300. The activation time information is information indicating a time required for the ONU 300 to execute the activation processing. The activation processing is processing for transition of the operation state of the ONU 300 from the sleep state to the activation state. Details of the activation processing will be described below.

The transceiver 22 inputs and outputs an optical signal to and from the optical fiber 400. The transceiver 22 converts an electrical signal output from the signal processing unit 23 into an optical signal and inputs the optical signal to the optical fiber 400. In addition, the transceiver 22 converts an optical signal received from the ONU 300 into an electrical signal and outputs the electrical signal to the signal processing unit 23.

The signal processing unit 23 performs signal processing related to data communication with the ONU 300. The signal processing unit 23 generates an activation signal in response to a predetermined event, and transmits the generated activation signal to the ONU 300 via the transceiver 22. For example, the signal processing unit 23 may periodically transmit the activation signal or may transmit the activation signal when a data transmission request to the ONU 300 occurs. In addition, the signal processing unit 23 acquires the activation time information from the ONU 300 and records the activation time information in the storage unit 21. Once the activation time information is acquired from the ONU 300, the signal processing unit 23 starts data transmission to the ONU 300 at a timing based on the activation time information in a case where the ONU 300 is activated thereafter.

The ONU 300 includes a processor such as a central processing unit (CPU) and memory. The OLT 200 functions as a device including a transceiver 31, a signal processing unit 32, a power supply unit 33, a power supply control unit 34, a state control unit 35, and a clocking unit 36 by the processor executing a program. Note that all or some of the functions of the ONU 300 may be implemented using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, ROM, a CD-ROM, or a semiconductor storage device (for example, a solid state drive (SSD)), or a storage device such as a hard disk or a semiconductor storage device built in a computer system. The program may be transmitted via an electric communication line.

The transceiver 31 inputs and outputs an optical signal to and from the optical fiber 400. The transceiver 31 converts an electrical signal output from the signal processing unit 32 into an optical signal and inputs the optical signal to the optical fiber 400. In addition, the transceiver 31 converts an optical signal received from the OLT 200 into an electrical signal and outputs the electrical signal to the signal processing unit 32.

The signal processing unit 32 performs signal processing related to data communication with the OLT 200. The signal processing unit 32 outputs the activation signal received from the OLT 200 to the state control unit 35, and transmits the activation time information output from the clocking unit 36 to the OLT 200.

The power supply unit 33 supplies power to each functional unit of the ONU 300. The power supply unit 33 may supply power stored in a battery or may supply power acquired from the outside of the ONU 300.

The power supply control unit 34 has a function of controlling a power supply target of the power supply unit 33. For example, the power supply control unit 34 supplies the power acquired from the power supply unit 33 to the clocking unit 36 and the state control unit 35 in the sleep state, and to all the functional units in the activation state. Note that the power supply control unit 34 may be configured as a part of the power supply unit 33.

The state control unit 35 has a function of controlling the operation state of the ONU 300. Specifically, the state control unit 35 causes the ONU 300 to transition to the activation state when an activation signal is received from the OLT 200 in the sleep state, and causes the ONU 300 to transition to the sleep state when a predetermined condition is satisfied in the activation state. For example, the state control unit 35 may cause the ONU 300 to transition to the sleep state in a case where data transmission and reception has not been performed for a predetermined time or more or may cause the ONU 300 to transition to the sleep state in a case where a predetermined time has elapsed since the transition to the activation state.

More specifically, in response to the output of the activation signal from the signal processing unit 32, the state control unit 35 instructs the power supply control unit 34 to change the power supply target from the target in the sleep state to the target in the activation state. Hereinafter, this instruction is referred to as an activation instruction. In addition, hereinafter, the processing executed by the state control unit 35 and the power supply control unit 34 in response to the reception of the activation signal and the processing executed at the time of activation by each functional unit activated from the sleep state are collectively referred to as "activation processing". The activation time is a time required for executing this activation processing.

In addition, the state control unit 35 has a function of notifying the OLT 200 of the activation time. The activation time is measured by the clocking unit 36. When the activation processing is completed, the state control unit 35 acquires information indicating the activation time (hereinafter referred to as "activation time information") from the clocking unit 36, and outputs the acquired activation time information to the signal processing unit 32. Note that, as described above, once the activation time information is acquired from the ONU 300, the OLT 200 starts data transmission to the ONU 300 at a timing based on the activation time information in a case where the ONU 300 is activated thereafter. Therefore, it is sufficient if the state control unit 35 performs the acquisition of the activation time information and the transmission at least once. For example, the state control unit 35 may be configured to perform the acquisition of the activation time information and the transmission at the time of initial execution of the activation processing.

Note that the acquisition of the activation time information may be configured to be performed according to a user's operation. For example, the state control unit 35 may be configured to execute the activation processing and acquire the activation time in a case where an operation for instructing the acquisition of the activation time information is input in the sleep state. In addition, for example, in a case where an operation instructing the acquisition of the activation time information is input in the activation state, each functional unit activated by the activation processing may be stopped, the activation processing may be executed again, and the activation time may be acquired.

The clocking unit 36 has a function of measuring the activation time. For example, the clocking unit 36 includes a clock signal acquisition means such as a crystal oscillator, and measures the activation time using a clock signal acquired by the means. A notification of the start timing and the end timing of the clocking is appropriately given from, for example, the state control unit 35 or the like. The clocking unit 36 outputs the activation time information indicating the activation time thus measured to the state control unit 35. Note that since the clocking unit 36 acquires the required time instead of clock time, the ONU 300 does not necessarily need to synchronize the clock time with the OLT 200. In addition, a clock signal may be input to the clock signal acquisition means from the outside.

Figure 2:
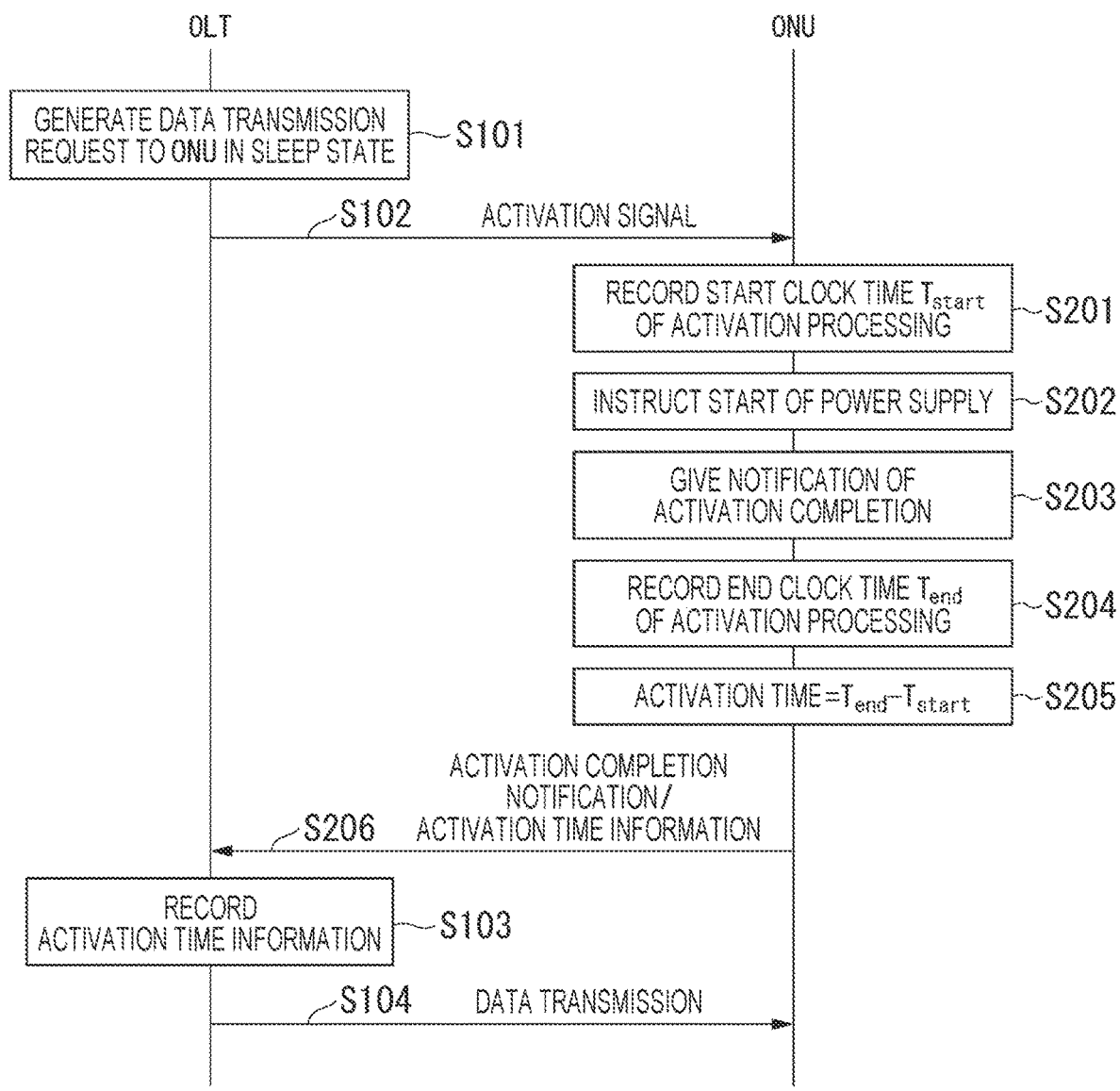
FIG. 2 is a sequence diagram illustrating a flow of processing of activating an ONU in a sleep state by transmitting an activation signal by an OLT in the optical communication system of the embodiment (in a case of transmitting a first activation signal).
Figure 3:
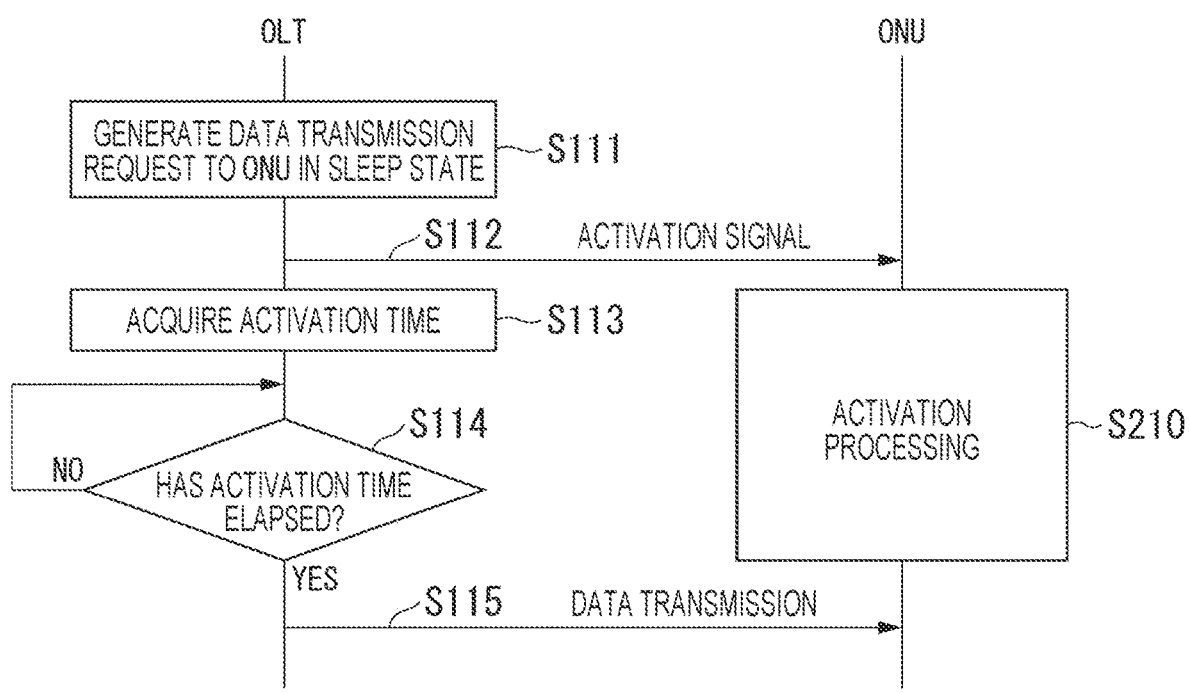
FIG. 3 is a sequence diagram illustrating a flow of processing of activating an ONU in a sleep state by transmitting an activation signal by an OLT in the optical communication system of the embodiment (in a case of transmitting a second and subsequent activation signals).

FIGS. 2 and 3 are sequence diagrams illustrating a flow of processing of activating the ONU 300 in the sleep state by transmitting an activation signal by the OLT 200 in the optical communication system 100 of the embodiment. FIG. 2 illustrates a flow of processing when the OLT 200 transmits the first activation signal to the ONU 300, and FIG. 3 illustrates a flow of processing when the OLT 200 transmits second and subsequent activation signals to the ONU 300.

First, the flow of processing in a case where the OLT 200 transmits the first activation signal to the ONU 300 will be described with reference to FIG. 2. First, in the OLT 200, in response to a data transmission request for the ONU in the sleep state being generated (step S101), the signal processing unit 23 transmits the activation signal to the ONU 300 (step S102).

Subsequently, in the ONU 300, the signal processing unit 32 outputs the activation signal received from the OLT 200 to the state control unit 35. The state control unit 35 determines whether or not the activation time information related to the activation processing executed in the past (or information indicating a start clock time and a completion clock time of the activation processing) is recorded in the own device, and acquires the activation time information by executing steps S201 to S206 when the activation time information is not recorded.

First, when the clocking unit 36 records start clock time $T_{start}$ of the activation processing in step S201, the state control unit 35 instructs the power supply control unit 34 to start power supply to the transceiver 31 and the signal processing unit 32 (step S202). In response to this instruction, the power supply control unit 34 starts power supply to the transceiver 31 and the signal processing unit 32, and the transceiver 31 and the signal processing unit 32 start activation. Upon completion of the activation, the transceiver 31 and the signal processing unit 32 notify the clocking unit 36 of that fact (step S203). In response to this notification, the clocking unit 36 records completion clock time $T_{end}$ of the activation processing (step S204). Subsequently, the clocking unit 36 calculates a difference between the recorded completion clock time $T_{start}$ and start clock time $T_{start}$ of the activation processing as the activation time, and notifies the signal processing unit 32 of the calculated activation time (step S205). The signal processing unit 32 transmits the activation time information indicating the activation time a notification of which has been given from the clocking unit 36 to the OLT 200 together with an activation completion notification (step S206).

Subsequently, in the OLT 200, the signal processing unit 23 acquires the activation completion notification and the activation time information from the ONU 300, and records the acquired activation time information in the storage unit 21 (step S103). Next, the signal processing unit 23 recognizes that the ONU 300 has transitioned to the activation state by receiving the activation completion notification, and starts data transmission to the ONU 300 accordingly (step S104).

Note that, in step S205, the clocking unit 36 may be configured to notify the signal processing unit 32 of the recorded start clock time $T_{start}$ and completion clock time $T_{end}$ of the activation processing without calculating the activation time. In addition, in this case, the signal processing unit 32 may be configured to transmit information indicating the start clock time $T_{start}$ and the completion clock time $T_{end}$ of the activation processing to the OLT 200 as the activation time information.

In addition, in this case, in the OLT 200, the signal processing unit 23 may be configured to calculate the activation time on the basis of the start clock time $T_{start}$ and the completion clock time $T_{end}$, and record the activation time information indicating the calculated activation time in the storage unit 21. In addition, in this case, in the OLT 200, the signal processing unit 23 may be configured to record the information indicating the acquired start clock time $T_{start}$ and completion clock time $T_{end}$ as the activation time information in the storage unit 21 without calculating the activation time. In addition, in this case, in the OLT 200, the signal processing unit 23 may be configured to calculate the activation time on the basis of the start clock time $T_{start}$ and the completion clock time $T_{end}$ indicated by the activation time information when the activation time of the ONU 300 becomes necessary.

Subsequently, the flow of processing in a case where the OLT 200 transmits second and subsequent activation signals to the ONU 300 will be indicated with reference to FIG. 3. First, in the OLT 200, in response to a data transmission request for the ONU in the sleep state being generated (step S111), the signal processing unit 23 transmits the activation signal to the ONU 300 (step S112). In response to the reception of the activation signal, the ONU 300 executes the activation processing (step S210). Here, for the sake of simplicity, the activation processing is collectively described as one step, but, for example, the processing of steps S202 and S203 in the example of FIG. 2 is executed as the activation processing.

Subsequently, the signal processing unit 23 acquires the activation time of the ONU 300 (step S113). Specifically, the signal processing unit 23 acquires the activation time of the ONU 300 by referring to the activation time information stored in the storage unit 21. Note that when the activation time information indicates the start clock time $T_{start}$ and the completion clock time $T_{end}$ of the activation processing, the signal processing unit 23 calculates the activation time on the basis of the start clock time $T_{start}$ and the completion clock time $T_{end}$.

Subsequently, the signal processing unit 23 determines whether the calculated activation time has elapsed since the transmission of the activation signal is completed (step S114). Here, when it is determined that the activation time has not elapsed since the transmission of the activation signal is completed (step S114-NO), a signal control unit 22 repeatedly executes step S114 until the activation time elapses. On the other hand, when it is determined that the activation time has elapsed since the transmission of the activation signal is completed (step S114—YES), the signal control unit 22 starts data transmission to the ONU 300 (step S115).

In this case, in the ONU 300, data reception from the OLT 200 starts after the elapse of the activation time after the activation signal is received from the OLT 200. In this case, since the activation processing should have been completed at the timing when the data reception from the OLT 200 is started, the ONU 300 can start the data reception from the OLT 200 promptly after the completion of the activation processing without transmitting the activation completion notification to the OLT 200. That is, the OLT 200 starts data transmission to the ONU 300 without waiting for reception of the activation completion notification from the ONU 300 for the ONU 300 for which activation time information has been acquired in advance. Thus, it is possible to eliminate the waiting time from when the ONU 300 completes its activation to when it starts data reception from the OLT 200, and thus, it is possible to reduce wasteful power consumption of the ONU 300.

Figure 4A:
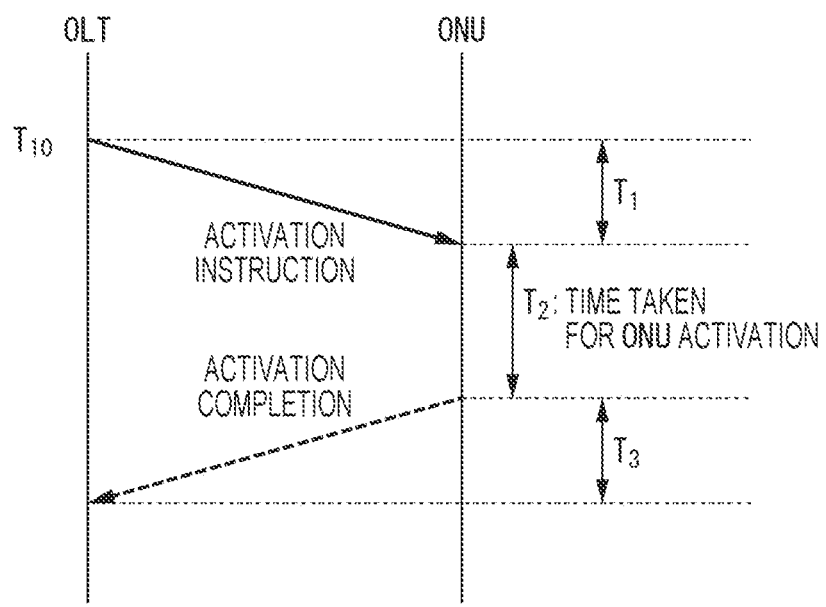
FIG. 4A is a time chart illustrating a flow of communication for activating an ONU in a sleep state by transmitting an activation signal by an OLT in the optical communication system of the embodiment.
Figure 4B:
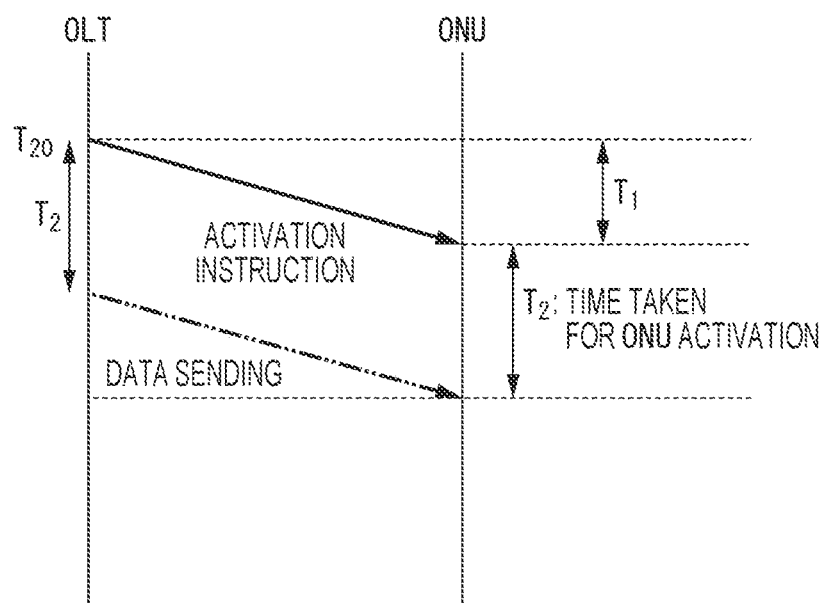
FIG. 4B is a time chart illustrating a flow of communication for activating an ONU in a sleep state by transmitting an activation signal by an OLT in the optical communication system of the embodiment.

FIGS. 4A and 4B are time charts illustrating a flow of communication for activating the ONU 300 in the sleep state by transmitting the activation signal by the OLT 200 in the optical communication system 100 of the embodiment. FIG. 4A illustrates a flow of processing when the OLT 200 transmits the first activation signal to the ONU 300, and FIG. 4B illustrates a flow of communication when the OLT 200 transmits second and subsequent activation signals to the ONU 300. First, a case where the first activation signal is transmitted will be described. First, in the OLT 200, a data transmission request to the ONU 300 in the sleep state occurs at clock time $T_{10}$, and the OLT 200 transmits a first activation signal to the ONU 300 in response to the data transmission request.

Subsequently, the ONU 300 receives the activation signal at clock time $T_{10}+T_1$. The time $T_1$ is a time required for the activation signal to reach the ONU 300 from the OLT 200. The ONU 300 starts the activation processing in response to the reception of the activation signal, and completes the activation processing at clock time $T_{10}+T_1+T_2$. The time $T_2$ is a time required from the start to the completion of the activation processing. Here, as described with reference to FIG. 2, the ONU 300 of the embodiment measures the time required for executing the activation processing at the time of executing the first activation processing. When completing the activation processing, the ONU 300 transmits the activation completion notification to the OLT 200. At this time, the ONU 300 transmits the activation completion notification together with the activation time information indicating the measured activation time $T_2$ together with the activation completion notification.

Subsequently, the OLT 200 receives the activation completion notification of the ONU 300 at clock time $t_{10}+T_1+T_2+T_3$. The OLT 200 stores the activation time information received together with the activation completion notification. Thereafter, the OLT 200 starts communication with the ONU 300. When the communication between the OLT 200 and the ONU 300 ends and a predetermined condition is satisfied, the ONU 300 transitions from the activation state to the sleep state again and waits for a next activation signal to be received.

Subsequently, in the OLT 200, a data transmission request to the ONU 300 in the sleep state occurs again at clock time $T_{20}$, and the OLT 200 transmits a second activation signal to the ONU 300 in response to the data transmission request.

Subsequently, the ONU 300 receives the activation signal at clock time $T_{20}+T_1$. As described above, the time $T_1$ is a time required for the activation signal to reach the ONU 300 from the OLT 200. The ONU 300 starts the activation processing in response to the reception of the activation signal, and completes the activation processing at clock time $T_{20}+T_1+T_2$. As described above, the time $T_2$ is a time required from the start to the completion of the activation processing.

On the other hand, when the transmission of the activation signal is completed, the OLT 200 starts clocking of the elapsed time from the timing and starts data transmission to the ONU 300 at a timing (clock time $T_{20}+T_2$) when the elapsed time reaches activation time $T_2$ of the ONU 300 with reference to the activation time information recorded at the time of the transmission of the first activation signal. As a result, in the ONU 300, since data reception from the OLT 200 is started at the timing when the activation processing is completed, the waiting time until the ONU 300 starts the data reception from the OLT 200 can be shortened, and wasteful power consumption can be suppressed.

Specifically, at the time of the transmission of the first activation signal, the OLT 200 starts the data transmission to the ONU 300 at clock time $T_{10}+T_1+T_2+T_3$ at which the activation completion notification has been received, and thus, in the ONU 300, the data reception is started at clock time $T_{10}+2T_1+T_2+T_3$. On the other hand, at the time of the transmission of the second activation signal, since the OLT 200 has already acquired the activation time information from the ONU 300, the data transmission to the ONU 300 starts at clock time $T_{20}+T_2$. Therefore, in the ONU 300, the data reception is started at clock time $T_{20}+T_1+T_2$. The same applies to transmission of third and subsequent activation signals. That is, with the optical communication system 100 of the embodiment, the waiting time can be shortened by time $T_1+T_3$ as compared with before (similar to the first time) at the time of transmission of the second and subsequent activation signals.

Note that, for some reason, there is a possibility that the activation processing of the ONU 300 does not complete within an assumed activation time. In consideration of such a possibility, the OLT 200 may be configured to start data transmission to the ONU 300 after a time obtained by adding a predetermined margin to the activation time $T_2$ of the ONU 300 has elapsed at the time of transmission of the second and subsequent activation signals.

The optical communication system 100 of the embodiment configured as described above includes a configuration of notifying the OLT 200 of the activation time required for the ONU 300 to transition from the sleep state to the activation state. Therefore, when a data transmission request is generated for the ONU 300 for which the activation time information has been acquired once, the OLT 200 can start data transmission at an earlier timing without waiting for an activation completion notification from the ONU 300. Specifically, the OLT 200 can start data transmission at a timing when the activation time of the ONU 300 has elapsed after transmission of the activation signal. Thus, since the waiting time in the activation state of the ONU 300 can be shortened, with the optical communication system 100 of the embodiment, it is possible to reduce power consumption of the optical network unit (ONU) in the optical communication system in which the optical line terminal (OLT) and the ONU are connected by the optical communication line.

Hereinafter, some specific examples of configurations that can be taken by the OLT 200 and the ONU 300 in the optical communication system 100 of the present embodiment will be described.

First Configuration Example

FIG. 5 is a diagram illustrating a first configuration example of the optical communication system 100 of the present embodiment. In the first configuration example, a clocking unit 36A of the ONU 300 includes a crystal oscillator and periodically acquires a clock signal from the OLT 200. The clocking unit 36A measures the activation time on the basis of the clock signal acquired by the crystal oscillator of the own device and the clock signal acquired from the OLT 200.

In order to measure the activation time by such a method, the OLT 200 in the first configuration example includes a clock signal unit 24. The clock signal unit 24 outputs a clock signal to a signal processing unit 23A. The clock signal unit 24 includes a clock signal generation means such as a crystal oscillator. A clock signal may be input to a clock signal acquisition means from the outside.

In this case, the signal processing unit 23A of the OLT 200 superimposes the clock signal on the transmission data of the data communication and transmits the superimposed signals to the ONU 300. On the other hand, in the ONU 300, a signal processing unit 32A acquires the data signal, the clock signal, and the activation signal from the reception signal of the data communication, and outputs the activation signal to the state control unit 35 and the clock signal to the clocking unit 36A. Note that, in this case, in the transceiver 31 and the signal processing unit 32A, the function related to acquisition of the activation signal is also operated in the sleep state. The clocking unit 36A measures the activation time using the clock signal input from the signal processing unit 32A, and notifies the signal processing unit 32A of the measured activation time.

In general, when clock time synchronization is performed using a master clock and a slave clock, jitter and wander generated in the transmission path can be reduced by the crystal oscillator on the slave side. The jitter and the wander generated in the transmission path cause a decrease in the accuracy of the clock time synchronization, and thus, in the configuration including the crystal oscillator capable of reducing the jitter and the wander on the slave side, a slave-side clock signal can be synchronized with a master-side clock signal with high accuracy. That is, in the first configuration example, the ONU 300 can perform clock time synchronization with the OLT 200 with high accuracy by using the clock signal acquired from the OLT 200 as a master clock and using the clock signal of the crystal oscillator provided in the clocking unit 36A as a slave clock. Therefore, since the ONU 300 can measure the activation time with the clock signal synchronized with the OLT 200 with high accuracy, it is possible to measure the activation time more precisely.

Second Configuration Example

FIG. 6 is a diagram illustrating a second configuration example of the optical communication system 100 of the present embodiment. The second configuration example is different from the first configuration example in that the ONU 300 includes a clocking unit 36B instead of the clocking unit 36A. The clocking unit 36B in the second configuration example does not include a crystal oscillator, and measures the activation time using a clock signal supplied from the OLT 200. Other configurations are similar to those of the first configuration example. In FIG. 6, the configurations similar to those of the first configuration example are denoted by the same reference numerals as those in FIG. 5, and the description thereof will be omitted here.

With such a configuration, even when the clock signal cannot be generated by the ONU 300, the clock signal can be acquired from the OLT 200, so that the ONU 300 can measure the activation time. In addition, in this case, the ONU 300 can precisely perform clock time synchronization with the OLT 200, and thus, can more precisely measure the activation time.

Note that, in a case where the ONU 300 does not include a crystal oscillator, the accuracy of clock time synchronization is lower than that in the first configuration example because jitter and wander generated in the transmission path cannot be reduced on the slave side. However, on the other hand, since the number of components constituting the ONU 300 can be reduced, it can be said that the second configuration example is more advantageous than the first configuration example in terms of cost.

Third Configuration Example

Figure 7:
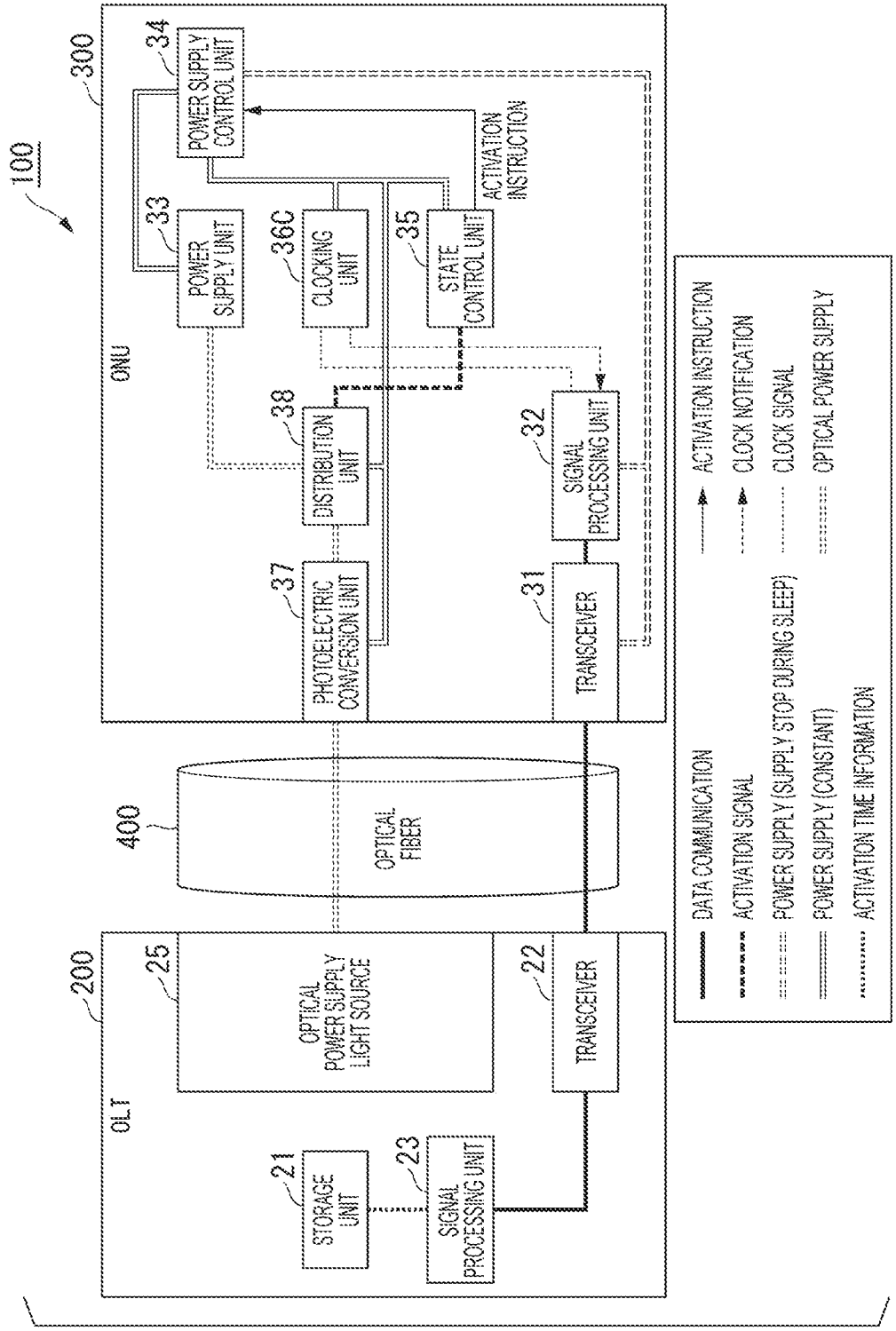
FIG. 7 is a diagram illustrating a third configuration example of the optical communication system of the present embodiment.

FIG. 7 is a diagram illustrating a third configuration example of the optical communication system 100 of the present embodiment. In the third configuration example, a clocking unit 36C of the ONU 300 includes a crystal oscillator, and measures the activation time on the basis of a clock signal output from the crystal oscillator. In addition, in the third configuration example, the OLT 200 includes an optical power supply light source 25 as an optical power supply means for the ONU 300. The optical power supply light source 25 transmits a signal (hereinafter referred to as a "power supply signal") for supplying power to the ONU 300 by optical power supply to the ONU 300 via the optical fiber 400.

On the other hand, the ONU 300 includes a photoelectric conversion unit 37 and a distribution unit 38 as means for receiving power supply by optical power supply from the OLT 200. Power is constantly supplied to the photoelectric conversion unit 37 and the distribution unit 38 by the power supply control unit 34. The photoelectric conversion unit 37 converts a power supply signal received from the OLT 200 from an optical signal into an electrical signal and outputs the electrical signal to the distribution unit 38. The distribution unit 38 inputs the electric signal of the power supply signal from the photoelectric conversion unit 37, and separates the electrical signal into a power supply signal and an activation signal. The distribution unit 38 outputs the activation signal to the state control unit 35 and outputs the power supply signal to the power supply unit 33. The power supply unit 33 supplies power supplied by the power supply signal to each functional unit of the ONU 300 via the power supply control unit 34.

With such a configuration, since transmission and reception of the activation signal can be separated from transmission and reception of the data signal, it is possible to suppress compression of a data communication band by the signal for state control of the ONU 300. Note that, in the third configuration example, the power supply unit 33 may include a storage battery that charges the power supplied by the power supply signal.

Note that, in the third configuration example, although the ONU 300 includes a recommended oscillator in the clocking unit 36C, the ONU 300 does not perform clock time synchronization with the OLT 200, and thus, the measurement accuracy of the activation time is lower than that in the case of performing clock time synchronization with the OLT 200 (for example, the first configuration example or the second configuration example). However, on the other hand, since the cost related to the realization of the clock time synchronization can be reduced, it can be said that the third configuration example is more advantageous than the first configuration example and the second configuration example in terms of cost.

Fourth Configuration Example

Figure 8:
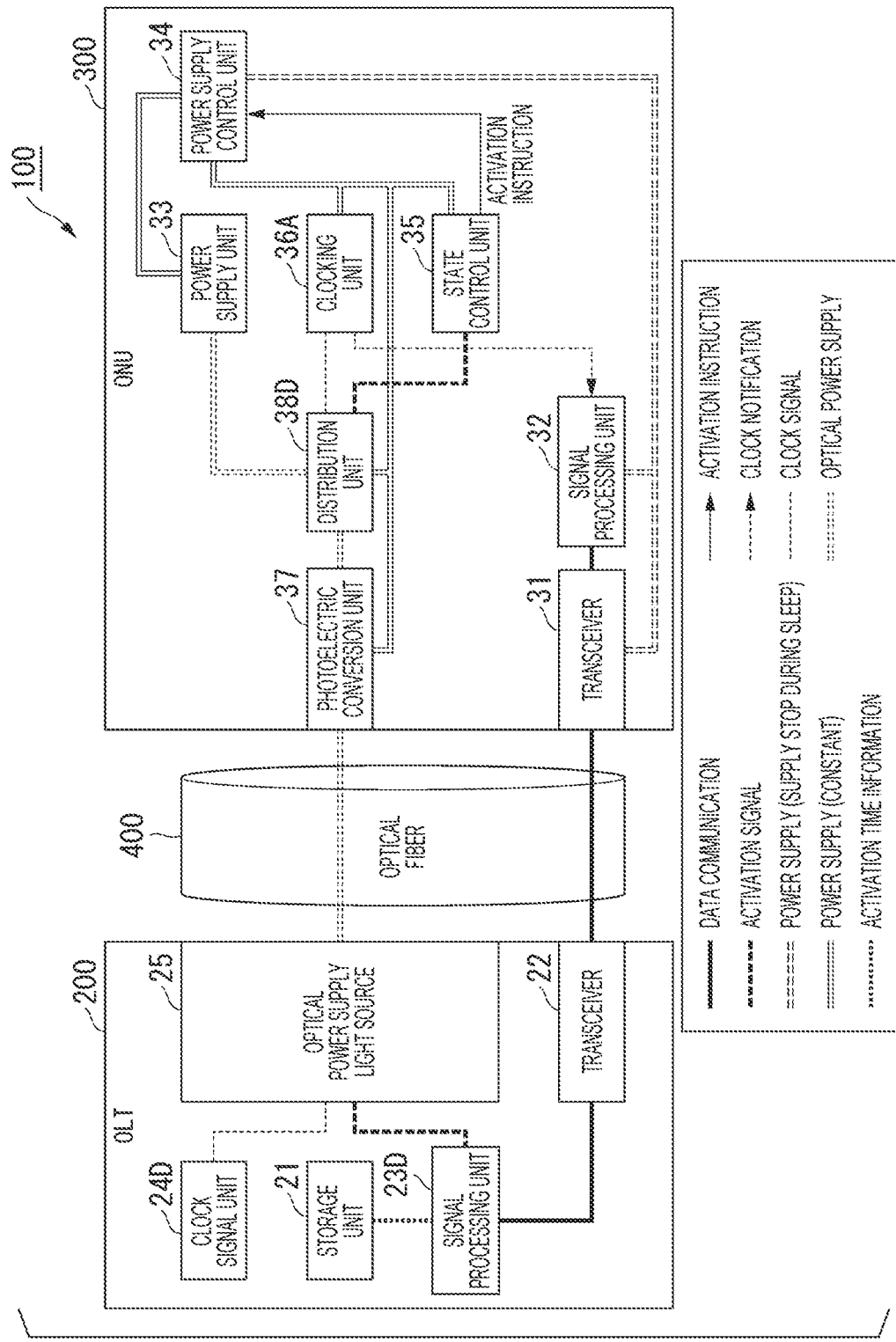
FIG. 8 is a diagram illustrating a fourth configuration example of the optical communication system of the present embodiment.

FIG. 8 is a diagram illustrating a fourth configuration example of the optical communication system 100 of the present embodiment. The fourth configuration example is different from the third configuration example in that the OLT 200 further includes a clock signal unit 24D, a signal processing unit 23D is provided instead of the signal processing unit 23, the ONU 300 includes a clocking unit 36A similarly to the second configuration example instead of the clocking unit 36, and a distribution unit 38D is provided instead of the distribution unit 38. The clocking unit 36A here is similar to the clocking unit 36A in the first configuration example (FIG. 5). Other configurations are similar to those of the third configuration example. In FIG. 8, the configurations similar to those of the third configuration example are denoted by the same reference numerals as those in FIG. 7, and the description thereof will be omitted here.

In this case, in the OLT 200, the signal processing unit 23D can perform data communication via the transceiver 22, and outputs the activation signal to the optical power supply light source 25. In addition, the clock signal unit 24D outputs a clock signal to the optical power supply light source 25. In addition to the activation signal, the optical power supply light source 25 also superimposes a clock signal on the power supply signal and transmits the superimposed signals to the ONU 300.

On the other hand, in the ONU 300, the distribution unit 38D inputs the electric signal of the power supply signal from the photoelectric conversion unit 37, and separates the activation signal and the clock signal from the electrical signal. The distribution unit 38D outputs the activation signal to the state control unit 35 and outputs the power supply signal from which the activation signal has been separated to the power supply unit 33. In addition, the distribution unit 38D outputs the clock signal to the clocking unit 36A.

With such a configuration, since transmission and reception of the clock signal and the activation signal can be separated from transmission and reception of the data signal, it is possible to suppress compression of a data communication band by the signal for state control of the ONU 300. In addition, with such a configuration, since the clock signal is constantly supplied from the OLT 200 to the ONU 300, the ONU 300 can precisely synchronize the clock time with the OLT 200, and can more precisely measure the activation time.

Fifth Configuration Example

Figure 9:
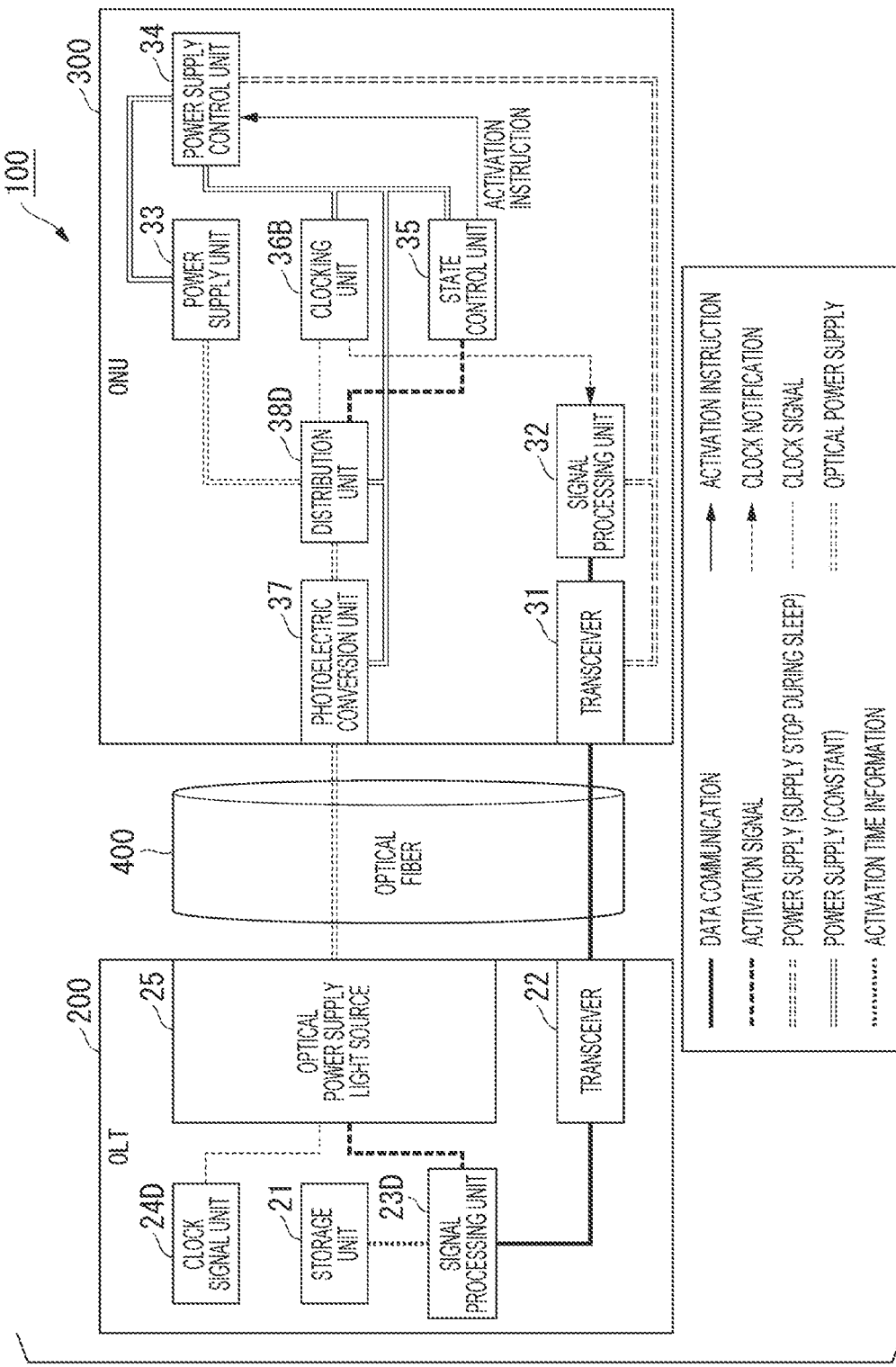
FIG. 9 is a diagram illustrating a fifth configuration example of the optical communication system of the present embodiment.

FIG. 9 is a diagram illustrating a fifth configuration example of the optical communication system 100 of the present embodiment. The fifth configuration example is different from the fourth configuration example in that the ONU 300 includes a clocking unit 36B instead of the clocking unit 36A. The clocking unit 36B here is similar to the clocking unit 36B in the second configuration example (FIG. 6), and the ONU 300 in the fifth configuration example does not have a clock signal generation means. Other configurations are similar to those of the fourth configuration example. In FIG. 9, the configurations similar to those of the fourth configuration example are denoted by the same reference numerals as those in FIG. 8, and the description thereof will be omitted here.

With such a configuration, since transmission and reception of the clock signal and the activation signal can be separated from transmission and reception of the data signal, it is possible to suppress compression of a data communication band by the signal for state control of the ONU 300. In addition, with such a configuration, even when the ONU 300 does not have a clock signal generation means and the clock signal cannot be generated by the ONU 300, the clock signal can be acquired from the OLT 200, so that the ONU 300 can measure the activation time. In addition, in this case, the ONU 300 can precisely perform clock time synchronization with the OLT 200, and thus, can more precisely measure the activation time.

Sixth Configuration Example

Figure 10:
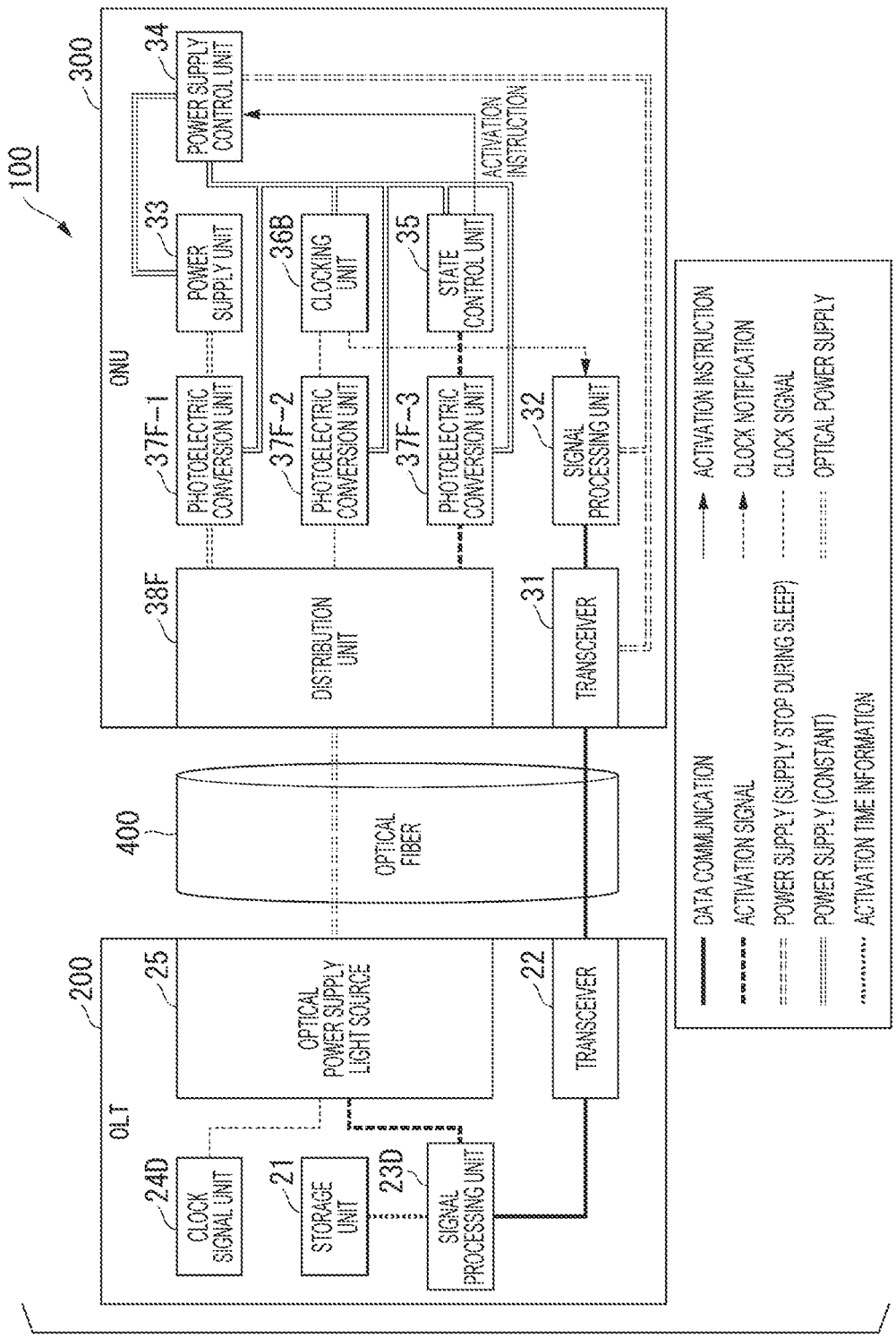
FIG. 10 is a diagram illustrating a sixth configuration example of the optical communication system of the present embodiment.

FIG. 10 is a diagram illustrating a sixth configuration example of the optical communication system 100 of the present embodiment. The sixth configuration example is different from the fifth configuration example in that the ONU 300 includes photoelectric conversion units 37F-1, 37F-2, and 37F-3 for the power supply unit 33, the clocking unit 36B, and the state control unit 35, respectively, and includes a distribution unit 38F instead of the distribution unit 38D. Other configurations are similar to those of the fifth configuration example. In FIG. 10, the configurations similar to those of the fifth configuration example are denoted by the same reference numerals as those in FIG. 9, and the description thereof will be omitted here.

In the sixth configuration example, the distribution unit 38F inputs the optical signal of the power supply signal, and distributes and outputs the input optical signal to the photoelectric conversion units 37F-1 to 37F-3 corresponding to the power supply unit 33, the clocking unit 36B, and the state control unit 35, respectively. The photoelectric conversion unit 37F-1 converts the distributed optical signal into an electric signal, extracts the power supply signal from the electrical signal, and supplies the extracted power supply signal to the power supply unit 33. The photoelectric conversion unit 37F-2 converts the distributed optical signal into an electric signal, extracts the clock signal from the electrical signal, and supplies the extracted clock signal to the clocking unit 36B. The photoelectric conversion unit 37F-3 converts the distributed optical signal into an electric signal, extracts the activation signal from the electrical signal, and supplies the extracted activation signal to the state control unit 35.

With such a configuration, since transmission and reception of the activation signal can be separated from transmission and reception of the data signal, it is possible to suppress compression of a data communication band by the signal for state control of the ONU 300. In addition, with such a configuration, even when the ONU 300 does not have a clock signal generation means and the clock signal cannot be generated by the ONU 300, the clock signal can be acquired from the OLT 200, so that the ONU 300 can measure the activation time. In addition, in this case, the ONU 300 can precisely perform clock time synchronization with the OLT 200, and thus, can more precisely measure the activation time.

Seventh Configuration Example

Figure 11:
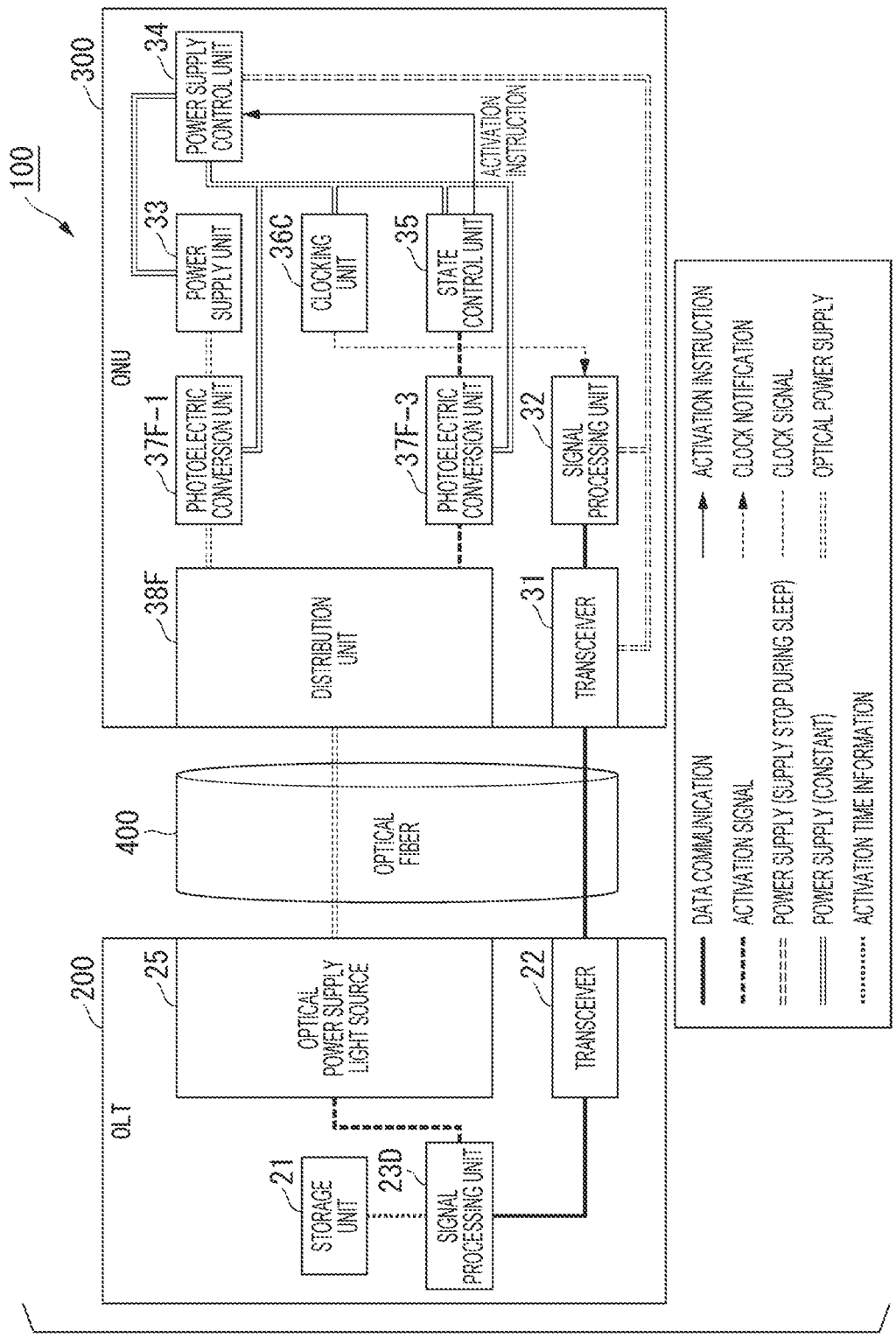
FIG. 11 is a diagram illustrating a seventh configuration example of the optical communication system of the present embodiment.

FIG. 11 is a diagram illustrating a seventh configuration example of the optical communication system 100 of the present embodiment. The seventh configuration example is different from the third configuration example in that photoelectric conversion units 37F-1 and 37F-3 are provided instead of the photoelectric conversion unit 37, and a distribution unit 38F is provided instead of the distribution unit 38. Other configurations are similar to those of the third configuration example. In FIG. 11, the configurations similar to those of the third configuration example are denoted by the same reference numerals as those in FIG. 7, and the description thereof will be omitted here.

Here, the photoelectric conversion units 37F-1 and 37F-3 and the distribution unit 38F are similar to those described in the sixth configuration example (FIG. 10). That is, in the seventh configuration example, the distribution unit 38F inputs the optical signal of the power supply signal, and distributes and outputs the input optical signal to the photoelectric conversion units 37F-1 and 37F-3 corresponding to the power supply unit 33 and the state control unit 35, respectively. The photoelectric conversion unit 37F-1 converts the distributed optical signal into an electric signal, extracts the power supply signal from the electrical signal, and supplies the extracted power supply signal to the power supply unit 33. The photoelectric conversion unit 37F-3 converts the distributed optical signal into an electric signal, extracts the activation signal from the electrical signal, and supplies the extracted activation signal to the state control unit 35.

With such a configuration, since transmission and reception of the activation signal can be separated from transmission and reception of the data signal, it is possible to suppress compression of a data communication band by the signal for state control of the ONU 300.

Eighth Configuration Example

Figure 12:
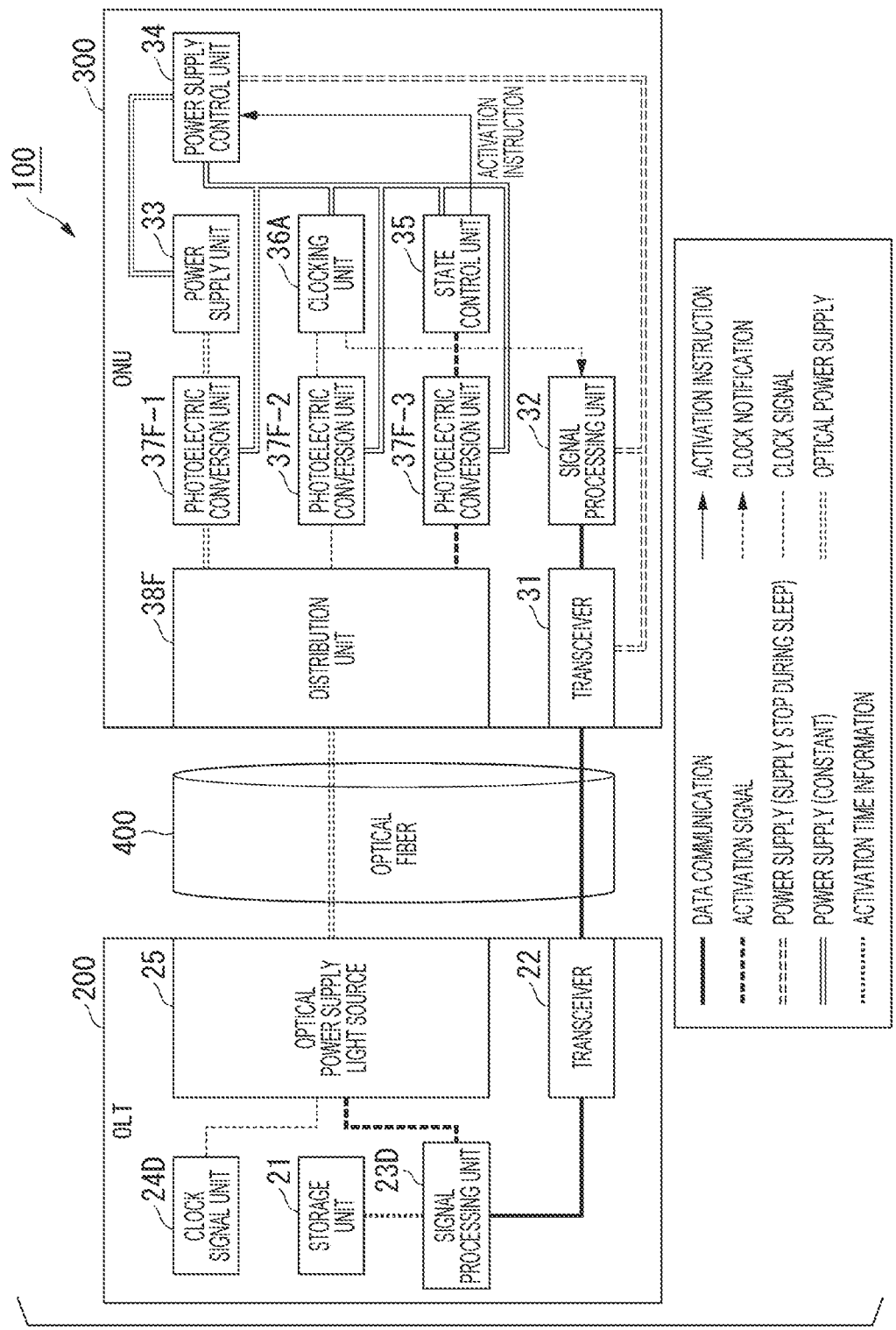
FIG. 12 is a diagram illustrating an eighth configuration example of the optical communication system of the present embodiment.
Figure 13:
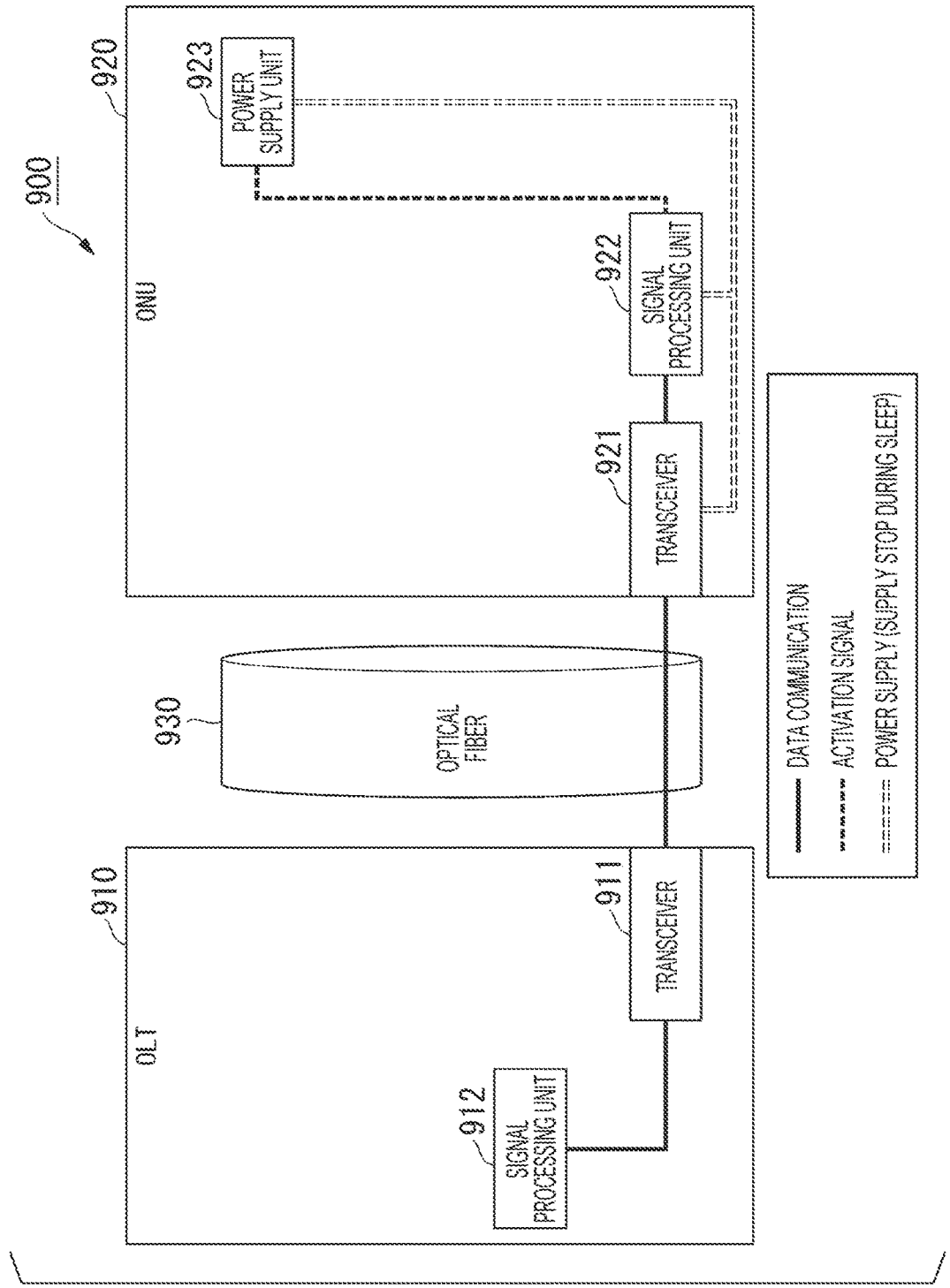
FIG. 13 is a diagram illustrating an outline of a configuration of an optical communication system of a conventional configuration.

FIG. 12 is a diagram illustrating an eighth configuration example of the optical communication system 100 of the present embodiment. The eighth configuration example is different from the sixth configuration example in that a clocking unit 36A is provided instead of the clocking unit 36B. The clocking unit 36A here is similar to the clocking unit 36A in the first configuration example (FIG. 5). Other configurations are similar to those of the sixth configuration example. In FIG. 12, the configurations similar to those of the sixth configuration example are denoted by the same reference numerals as those in FIG. 10, and the description thereof will be omitted here.

With such a configuration, even when the ONU 300 does not have a clock signal generation means and the clock signal cannot be generated by the ONU 300, the clock signal can be acquired from the OLT 200, so that the ONU 300 can measure the activation time. In addition, in this case, the ONU 300 can precisely perform clock time synchronization with the OLT 200, and thus, can more precisely measure the activation time.

Although the embodiment of this invention has been described in detail with reference to the drawings, specific configurations are not limited to this embodiment, and include design and the like within a range without departing from the gist of this invention.

INDUSTRIAL APPLICABILITY

The present invention is applicable to an optical communication system.

REFERENCE SIGNS LIST

100 Optical communication system
200 OLT (Optical Line Terminal)
21 Storage unit
22 Transceiver
23 Signal processing unit
300 ONU (Optical Line Unit)
31 Transceiver
32 Signal processing unit
33 Power supply unit
34 Power supply control unit
35 State control unit
36 Clocking unit
400 Optical fiber
900 Optical communication system of conventional configuration
910 OLT
911 Transceiver
912 Signal processing unit
920 ONU
921 Transceiver
922 Signal processing unit
923 Power supply unit
930 Optical fiber

The invention claimed is:

1. An optical communication system in which an optical line terminal and an optical network unit are connected by an optical communication line, wherein:
   when receiving, at a first time, a first activation signal from the optical line terminal in a sleep state, the optical network unit is configured to:
      execute activation processing for transition from the sleep state to an activation state; and
      notify the optical line terminal of an activation time that is an amount of time required for the optical network unit to execute the activation processing from the sleep state to the activation state, and
   the optical line terminal is configured to:
      transmit a second activation signal at a second time;
      start data transmission to the optical network unit after elapse of the activation time based on the notification of the activation time by the optical network unit.

2. An optical communication system in which an optical line terminal and an optical network unit are connected by an optical communication line, wherein:
   when receiving a first activation signal from the optical line terminal in a sleep state, the optical network unit is configured to execute activation processing for transition from the sleep state to an activation state and notifies the optical line terminal of an activation time that is a time required for executing the activation processing, and
   the optical line terminal is configured to transmit the activation signal at a time of transmission of second and subsequent activation signals, and then the optical line terminal is configured to start data transmission to the optical network unit after elapse of the activation time, a notification of which has been given from the optical network unit, wherein:
   the optical network unit includes:
      a transceiver configured to input and output an optical signal,
      a first signal processing unit configured to perform data communication with the optical line terminal,
      a clocking unit configured to measure the activation time,
      a power supply unit configured to supply power to an own device, and
      an activation processing unit configured to execute the activation processing in response to input of the activation signal, wherein:
         when the activation signal is received, the first signal processing unit is configured to output the received activation signal to the activation processing unit and notify the optical line terminal of the activation time measured by the clocking unit, and
         the activation processing unit is further configured to activate the transceiver and the first signal processing unit by executing the activation processing in the optical network unit in the sleep state in which the activation processing unit and the clocking unit are activated.

3. The optical communication system according to claim 2, wherein
   the optical line terminal includes:
   a clock signal output unit configured to output a clock signal, a second signal processing unit configured to perform data communication with the optical network unit, and transmit the clock signal and the activation signal to the optical network unit, wherein the clocking unit is configured to measure the activation time on a basis of the clock signal received from the optical line terminal.

4. The optical communication system according to claim 2, wherein the optical line terminal includes:

an optical power supply light source, which is a light source for optical power supply, the optical power supply light source configured to superimpose the activation signal on a power supply signal for the optical power supply and transmit the superimposed signals to a subscriber line terminal device, the subscriber line terminal device including:

an optical power supply signal input unit configured to input the power supply signal and the activation signal from the optical power supply light source, and output the power supply signal to the power supply unit and the activation signal to the activation processing unit, respectively, and the power supply unit configured to supply power supplied by the power supply signal to each functional unit of the subscriber line terminal device.

5. The optical communication system according to claim 4, wherein the optical line terminal further includes a clock signal output unit configured to output a clock signal, the optical power supply light source is configured to superimpose the clock signal on the power supply signal and transmit the superimposed signals to the subscriber line terminal device, and the optical power supply signal input unit is further configured to input the clock signal from the optical power supply light source and output the clock signal to the clocking unit.

6. An optical network unit, comprising:

a transceiver configured to input and output an optical signal; and one or more processors configured to:

when receiving a first activation signal from the optical line terminal in a sleep state, the optical network unit is configured to:

execute activation processing for transition from the sleep state to an activation state; and notify an optical line terminal of an activation time that is an amount of time required for the optical network unit to execute the activation processing from the sleep state to the activation state.

\* \* \* \* \*